United States Patent
Kirkwood Azmat et al.

(10) Patent No.: US 11,068,755 B2
(45) Date of Patent: Jul. 20, 2021

(54) LOCATING METHOD AND A LOCATOR SYSTEM FOR LOCATING A BILLET IN A STACK OF BILLETS

(71) Applicant: Primetals Technologies Germany GmbH, Erlangen (DE)

(72) Inventors: Ruth Kirkwood Azmat, Jefferson, MA (US); Paul Barry Riches, Paxton, MA (US); Mateusz Wojtaszek, Radymno (PL)

(73) Assignee: PRIMETALS TECHNOLOGIES GERMANY GMBH

( * ) Notice: Subject to any disclaimer, the term of this patent is extended or adjusted under 35 U.S.C. 154(b) by 55 days.

(21) Appl. No.: 16/556,533

(22) Filed: Aug. 30, 2019

(65) Prior Publication Data
US 2021/0064940 A1     Mar. 4, 2021

(51) Int. Cl.
G06K 9/62     (2006.01)

(52) U.S. Cl.
CPC ................... G06K 9/6284 (2013.01)

(58) Field of Classification Search
None
See application file for complete search history.

(56) References Cited

U.S. PATENT DOCUMENTS

| | | | | |
|---|---|---|---|---|
| 2006/0204108 A1* | 9/2006 | Littooij | ............ | B22D 11/12 382/218 |
| 2018/0155811 A1* | 6/2018 | Ferrasse | ............ | C22F 1/053 |

FOREIGN PATENT DOCUMENTS

| | | | |
|---|---|---|---|
| CN | 101422835 A | * | 5/2009 |
| CN | 201838012 U | * | 5/2011 |
| CN | 102446266 A | * | 5/2012 |
| CN | 101905304 B | * | 9/2013 |
| CN | 104215179 A | * | 12/2014 |
| CN | 106780483 | | 5/2017 |
| KR | 20020007805 A | * | 1/2002 |

OTHER PUBLICATIONS

Chao-Yung Hsu et al., "Vision-based Automatic Identification Tracking of Steel Products for Intelligent Steel Manufacturing," *2017 IEEE International Symposium on Multimedia*, pp. 376-377 (2017).
Chao-Yung Hsu et al., "Depth-based Feature Extraction-Guided Automatic Identification Tracking o Steel Products for Smart Manufacturing in Steel 4.0," *Proceedings of IEEE International Conference on Applies System Innovation 2018*, pp. 145-146 (2018).
Ömer Cengiz Çelebi, "Chapter I Pattern Classification" <<https://byclb.com/TR/Tutorials/neural-networks/ch1_1.htm>>, accessed on May 10, 2019.
International Search Report and Written Opinion, dated Nov. 24, 2020, issued in corresponding International Patent Application No. PCT/EP2020/073847. Total 15 pages.

* cited by examiner

*Primary Examiner* — Fayyaz Alam
(74) *Attorney, Agent, or Firm* — Ostrolenk Faber LLP (57) ABSTRACT

A locating system that performs a locating method for locating a flame-cut billet in a stack of flame-cut billets that includes an imager that obtains an image of an end surface of a billet, a classifier that classifies the image of the end surface, and a matcher that matches the classified image of the end surface with a classified image from among a plurality of classified images stored in a classified image storage.

20 Claims, 5 Drawing Sheets

LOCATING METHOD AND A LOCATOR SYSTEM FOR LOCATING A BILLET IN A STACK OF BILLETS

FIELD OF THE INVENTION

The present invention relates to a method and a system for locating a billet in a stack of billets using imaging.

BACKGROUND OF THE INVENTION

In the metal production industry, the tracking and the locating of the metal product (for example, a billet) is important. Reliable locating of a billet, for example, would allow for a more efficient manufacturing process flow.

The known tracking methods rely on the embedding of, for example, tags, or the marking of the metal product followed by vision-based recognition. However, metal product making (for example, continuous casting) is a high temperature process. Thus, the automatic and reliable locating of the billet remains a challenge.

To solve this problem, vision-based automatic tracking methods have been proposed CN 106780483, for example, discloses a method for obtaining billet characteristics and extracting the coordinates of the center of the end surface of the billet through image processing in a continuous casting billet production environment to build an automatic positioning system for automatically identifying the cast billet to improve the labeling efficiency and labeling accuracy of the continuous casting process.

Vision-based Automatic Identification Tracking of Steel Products for Intelligent Steel Manufacturing (Chao-Yung Hsu, 2017 IEEE International Symposium on Multimedia, pp. 376-377), for example, discloses a method for automatically tracking steel products using a vision-based automatic identification tracking framework (without embedding any identification codes) by extracting visual features from the steel products.

Depth-based Feature Extraction-Guided Automatic Identification Tracking of Steel Products for Smart Manufacturing in Steel 4.0 (Chao-Yung Hsu, *Proceedings of IEEE International Conference on Applied System Innovation* 2018, pp. 145-146), for example, discloses a method that uses vision-based automatic identification tracking (without embedding any identification codes onto the product surface), which method also includes extracting visual features from the steel image.

SUMMARY OF THE INVENTION

It is an object of the present invention to provide a locating method and a locator system to locate a billet in a stack of billets without using a tag or a marker.

In continuous casting, a billet may be cut out of the cast material using a flame cutter. The flame cutter leaves a leading end surface and a trailing end surface each having a unique surface pattern due to the flame cutting.

In a locating method and a locator system according to the present invention the surface pattern of the leading end surface and/or the surface pattern of the trailing end surface of a billet, that has been cut using a flame cutter, is used to identify the billet.

A locator system according to the present invention is configured to locate a flame-cut billet in a stack of flame-cut billets, and to send location information of a located billet to, for example, a billet marker, a billet transporter, a billet location storage system, or a billet location display system.

The locator system may include an imager having at least one digital camera (preferably two digital cameras) that can acquire a digital image of a first end or a second end of a billet in a stack of billets, an image classifier that includes at least one computer configured to classify a surface having surface characteristics resulting from flame cutting, and configured to classify a digital image of a first end or a second end of a billet that is received from the imager, and an image matcher that includes a computer configured to match a classified digital image of a first end or a second end of a billet that is received from the image classifier with a classified image from among a plurality of classified images stored in a classified image storage.

The image classifier preferably classifies the digital image of the first end or the second end of the billet using pattern classification and recognition, which is a known method of classification and recognition of surface characteristics of an object.

The image matcher may match the classified digital image of the first end or the second end of the billet (target image) by comparing the target image to the plurality of classified images stored in the classified image storage, and, if the comparing does not result in a match, by further comparing an angularly rotated target image to the plurality of classified images stored in the classified image storage until a match is made, or no match is made.

In one embodiment, the image matcher may rotate the target image to obtain the angularly rotated target image.

In another embodiment, the image matcher may request the image classifier to angularly rotate the target image, and performs the matching based on an angularly rotated target image received from the image classifier.

The classified image storage may be connected to another image classifier that classifies a digital image of a leading end or a trailing end of a billet captured by a digital camera (preferably two digital cameras) of another imager after the billet is cut with a flame cutter. The at least one digital camera (or the two digital cameras) are capable of capturing images of the leading end or the trailing end of the billet at a temperature of up to 1200° C.

The another image classifier also classifies a surface having surface characteristics resulting from flame cutting, using, preferably, pattern classification and recognition.

The another image classifier, for each billet, classifies an image of a leading end of the billet and an image of a trailing end of the billet and may store the classified leading and trailing end images in the classified image storage in association with one another.

The image matcher may first match the classified digital image of the first end or the classified digital image of the second end (target image) of the billet to either a classified leading end image or a classified trailing end image (reference image) stored in the classified image storage, and, after the target image is matched with a reference image, the image matcher may match a classified image associated with the matched reference image with the classified digital image of the end of the billet that is opposite the target image.

The image matcher may match the classified digital image of the target image by comparing the target image to the plurality of classified images stored in the classified image storage, and, if the comparing does not result in a match, by further comparing an angularly rotated target image to the classified images stored in the classified image storage until a match is made, or no match is made.

In one embodiment, the image matcher may rotate the classified digital image of the first end or the second end of the billet to obtain the angularly rotated target image.

In another embodiment, the image matcher may request the image classifier to angularly rotate the image of the target image, and performs the matching based on the angularly rotated target image received from the image classifier.

A locating method according to the present invention locates a flame-cut billet in a stack of flame-cut billets by capturing an image of an end of a billet in a stack of billets with an imager that includes at least one digital camera that can acquire a digital image, classifying the image of the end of the billet captured by the imager using an image classifier that includes at least one computer configured to classify a surface having surface characteristics resulting from flame cutting, and matching the classified image of the end of the billet to a classified image from among a plurality of classified images in a classified image storage using an image matcher that includes a computer configured to match a classified digital image of an end of a billet with a classified image from among a plurality of classified images stored in the classified image storage.

The classifying may be performed using pattern classification and recognition.

The matching may be performed by comparing the classified image of the end of the billet (target image) to the plurality of classified images stored in the classified image storage, and, if the comparing does not result in a match, by further comparing an angularly rotated target image to the plurality of classified images stored in the classified image storage until a match is made, or no match is made.

In one embodiment, the angularly rotated target image can be obtained by rotating the target image in the image matcher, or, in another embodiment, rotating the target image with the image classifier.

The matching may be performed by first matching the target image to either a classified leading end image or a classified trailing end image (reference image) stored in the classified image storage, and, after the target image is matched with a reference image, matching a classified image associated with the matched reference image with the classified digital image of the end of the billet that is opposite the target image.

Other features and advantages of the present invention will become apparent from the following description of the invention which refers to the accompanying drawings.

DETAILED DESCRIPTION OF EMBODIMENTS OF THE INVENTION

A "billet" or "flame-cut billet" as used herein refers to a billet cut from a continuously cast metal product using a flame cutter. An "end" of the billet refers to the surface at the end between the top, the bottom, and the side edges which exhibits characteristic features resulting from flame cutting.

Figure 1:
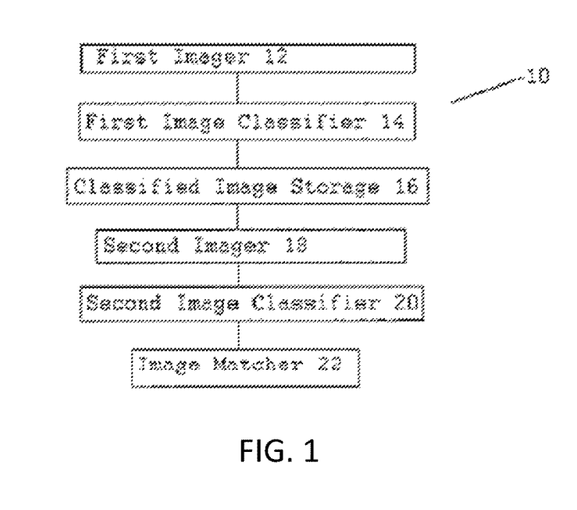
FIG. 1 illustrates a system according to the present invention.

Referring to FIG. 1, a method according to the present invention is implemented with a system 10 that includes a first imager 12, a first image classifier 14, a classified image storage 16, a second imager 18, a second image classifier 20, and an image matcher 22.

The first imager 12 is an image acquisition system that includes at least one camera, preferably a digital camera, that is suitable for acquiring a digital image of a leading end or a trailing end of a billet while the billet is hot. The exterior surface temperature of the billet may be up to 1200° C. The exterior surface temperature of the billet may be as low as the ambient temperature (for example, 25° C.). The exterior surface temperature of the billet depends on the speed of casting, the slower the casting speed the lower the temperature. The first imager 12 may include two digital cameras, one provided to acquire a digital image of a leading end of the billet, and the other provided to acquire a digital image of the trailing end of a billet.

The first image classifier 14 is a system that includes a computer or a plurality of computers operatively connected to the first imager 12 to receive and classify digital images of the leading ends and the trailing ends of the billets from the first imager 12. Thus, in operation, the first image classifier 14 will classify the leading end image and the trailing end image of a billet acquired by the first imager 12.

The classified image storage 16 is a system that includes a computer or a plurality of computers configured (programmed) to receive and retain computer-readable files in computer-readable, non-volatile memory locations, the computer-readable files containing information pertaining to each classified (leading or trailing end) image that is classified by the first image classifier 16.

The second imager 18 is an image acquisition system that includes at least one camera (preferably a digital camera) that is suitable for acquiring a digital image of a first end or a second end of a billet. The second imager 18 may include two digital cameras, one for acquiring an image of the first end of a billet, and another for acquiring an image of the second end of the same billet.

The second image classifier 20 is a system that includes a computer or a plurality of computers operatively connected to the second imager 18 to receive, and configured (programmed) to classify digital images of the first end and the second end of a billet that are received from the second imager 18.

The image matcher 22 is a system that includes a computer or a plurality of computers operatively connected to the second image classifier 20 to receive computer-readable files containing information pertaining to each classified image of an end of the billet that is classified by the second image classifier 20.

The image matcher 22 is configured (programmed) to communicate with the classified image storage 16 and to match an image of the first end of the billet and an image of the second end of the billet classified by the second image classifier 14 with an image of the leading end of the billet or the trailing end of the billet classified by the first image classifier 14 that is stored in the classified image storage 16. The image matcher 22 is in communication with a user interface 23 (for example, a computer that includes also a visual display and an input device, such as a keyboard) for receiving instructions to match an image.

Following the image matching by the image matcher 22, the system 10 may take steps such as mark the billet (e.g. with a stamp or a paint spray nozzle), identify and store (in a computer memory) the location of the billet in the stack of billets, or operate a forklift, a crane, or similar means, to move the identified billet from its location to another location.

The first image classifier 14 and the second image classifier 20 are both programmed to perform a method to create a computer-readable file containing information that uniquely identifies each image of an end of a billet that is acquired by an imager. The classification method may be based on pattern classification and recognition, which can classify and recognize a surface pattern.

The classified image storage 16 stores at least the computer-readable files produced by the first image classifier 12 in a computer-searchable manner. Preferably, the classified image storage 16 includes a document management system or the like system.

Figure 2:
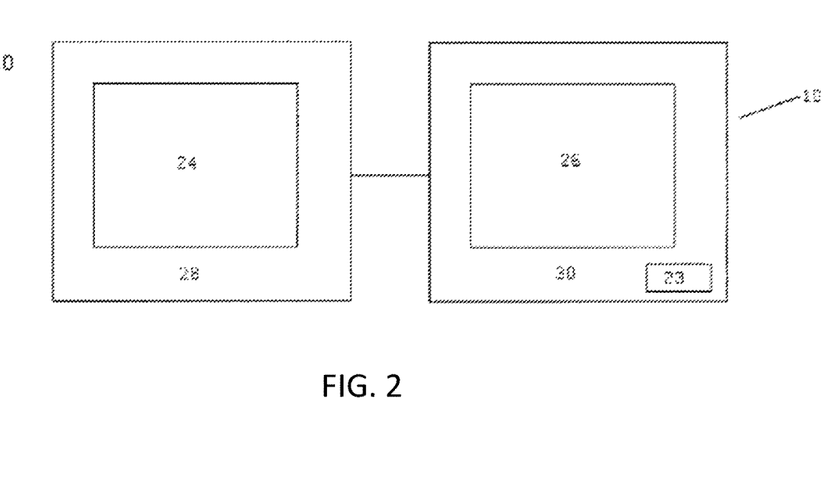
FIG. 2 illustrates an embodiment of the present invention in a deployed state.

Referring now to FIG. 2, a system 10 according to the present invention includes an input side 24 and an output side 26.

The input side 24 includes the first imager 12, the first image classifier 14, and the classified image storage 16.

The output side 26 includes the second imager 18, the second image classifier 20, and the image matcher 22.

The input side 24 may be arranged at a billet production facility 28 that, for example, produces billets through a continuous casting process.

The output side 26 may be arranged at a metal storage facility 30 that, for example, stores billets for production of metal products, such as sheet metal products, beams or pipes. The metal storage facility 30 may be part of a metal product production facility, or may be a facility used solely for the purpose of storing billets produced at the billet production facility 28.

Figure 3:
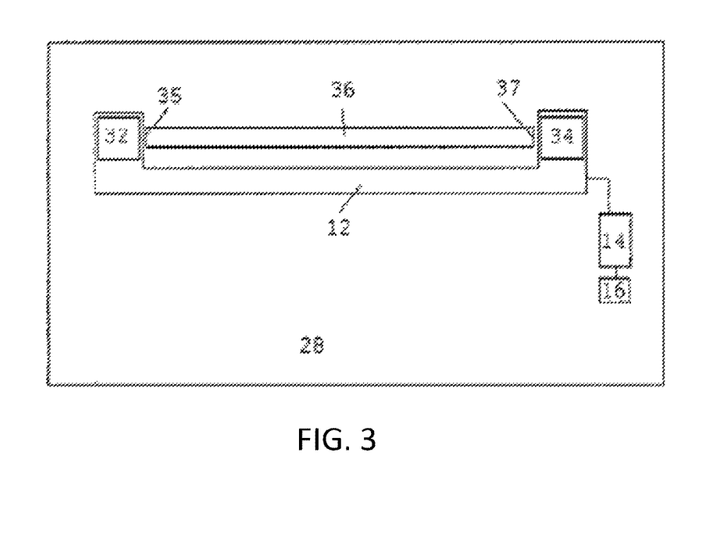
FIG. 3 illustrates an example of an input side of a system according to the present invention.

Referring to FIG. 3, at the billet production facility 28, a first digital camera 32 and a second digital camera 34 (which are part of the first imager 12), are installed at a location to capture an image of the leading end and the trailing end of a billet after the billet is cut from the continuous cast using, for example, a flame cutter. Specifically, for example, the first camera 32 is arranged to capture an image of the leading end 35 of the billet 36, and the second camera 34 is arranged to capture an image of the trailing end 37 of the billet 36 after the billet 36 after the billet is cut using a flame cutter. Preferably, the leading end 35 image and the trailing end 37 image of the billet are captured by cameras 32, 34 while the billet is still hot, i.e. as hot as 1200° C.

The image of the leading end 35 of the billet 36 that is captured by the first camera 32, and the image of the trailing end 37 of the billet 36 that is captured by the second camera 34 are sent to the first image classifier 14. The first image classifier 14 is programmed to classify the image of the leading end 35 of the billet 36 and the trailing end 37 of the billet 36 using pattern classification and recognition. Once each image is classified, both end images are stored in the classified image storage 16 and associated with one another as a pair to indicate that the images are the leading end image and the trailing end image of the same billet.

The billet 36 is then transported to the metal storage facility 30, which may be a location remote from the billet production facility 28.

Figure 4:
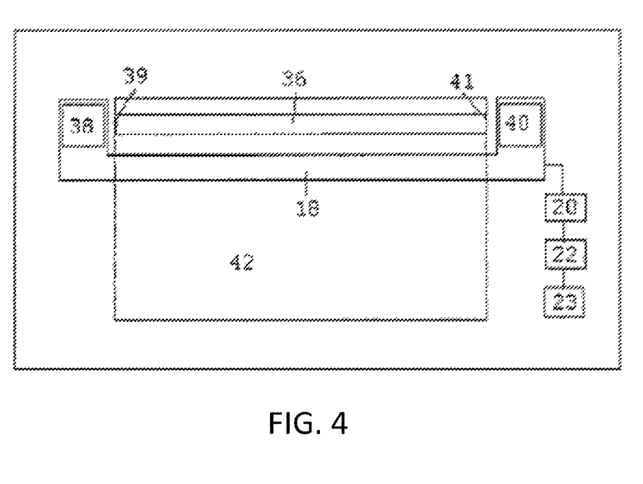
FIG. 4 illustrates an example of an output side of a system according to the present invention.

The output side 26, which may be arranged at the metal storage facility 30, includes a third camera 38, and a fourth camera 40 (which are part of the second imager 18). Cameras 38 and 40 are preferably digital cameras. A stack 42 of billets is stored at the facility 30, and billet 36 would be stored in the stack among other billets.

In order to identify the location of each billet, including billet 36, each camera 38, 40 is moved automatically to capture an image of an end of a billet in the stack. That is, the third camera 38 captures an image of a first end 39 of a billet and the fourth camera 40 captures an image of the second end 41 of the same billet.

The images of the first end 39 and the second end 41 so captured by the third and the fourth cameras 38, 40 are fed to and received by the second image classifier 20. The second image classifier 20 is programmed to classify the end images received from the cameras 38, 40 using pattern classification and recognition. The images so classified are then sent to the image matcher 22.

The image matcher 22 then takes the classified image of the first 39 and the second 41 end of the billet and proceeds to match each classified image to a classified image of a leading end or a trailing end of a billet stored in the classified image storage 16. For example, the image matcher 22 may first try to match a classified image received from the second image classifier 20 to a classified leading end image. If that does not result in a match, the image matcher 22 proceeds to match the classified image received from the second image classifier 20 to a classified trailing end image that is stored in the classified image storage 16.

To match a classified image received from the second image classifier 20 (hereafter referred to as the "target image") to a classified leading end image or a classified trailing end image, the target image may need to be rotated because, for example, the orientation of the billet 36 in the stack 42 may not be the same as its orientation when images of the leading end 35 and its trailing end 37 were captured by the first imager 12.

Figure 5:
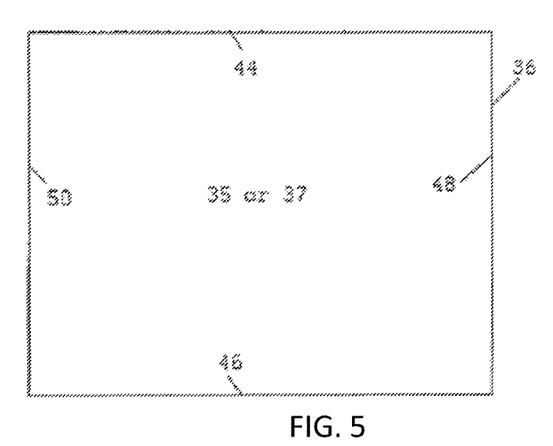
FIG. 5 illustrates an image of an end of a billet captured at the input side of the system.

Specifically, referring to FIG. 5, which illustrates an end of the billet 36 that could be a leading end 35 or a trailing end 37, when the first imager 12 captures an image of the end 35 or 37 using a camera 32 or 34, the image of the end will have a top edge 44, a bottom edge 46, a right side edge 48, and a left side edge 50. The image of the end 35 or 37 will be classified by the first image classifier 14 relative to the edges 44, 46, 48, 50 and their respective relative positions to one another.

At the output side 30, when placed in the stack 42, the billet 36 may be rotated such that, for example, the top edge 44 will be located at the bottom. Thus, the image of an end 35 or 37 captured by the second imager 18 will be rotated one hundred eighty degrees relative to the image of the end 35 or 37 taken by the first imager 12. The image of an end 39 or 41 needs to be reoriented every time the matcher 22 makes a comparison of a target image to a classified leading end image or a classified trailing end image in the classified image storage 16.

Figure 6A:
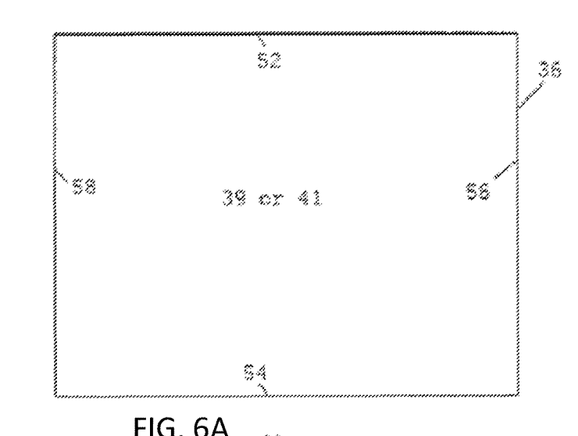
FIGS. 6A-6D illustrate images of an end of a billet captured at the output side of a system according to the present invention in different orientations.
Figure 6B:
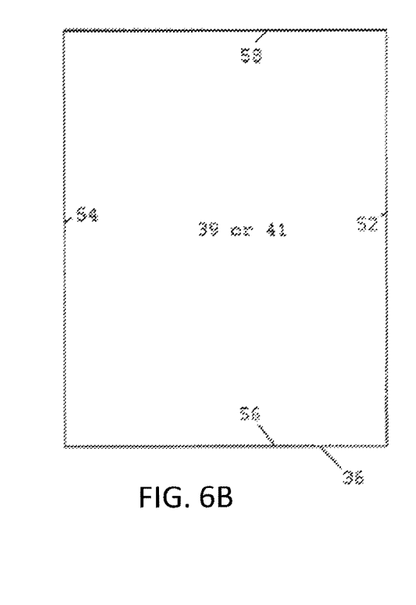
Figure 6C:
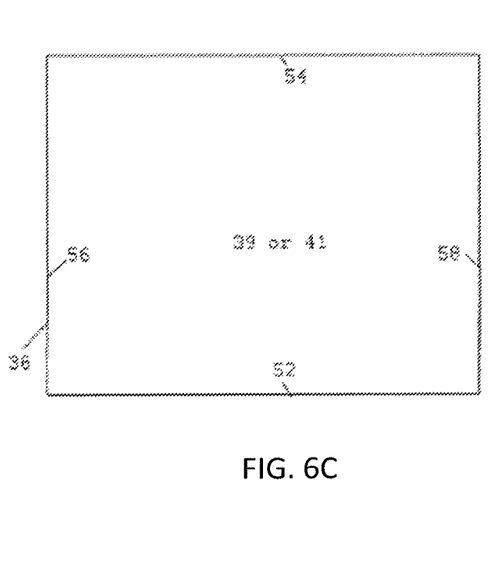
Figure 6D:
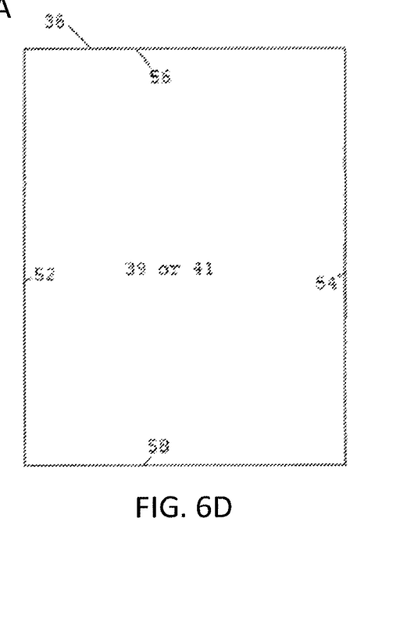

FIG. 6A illustrates an image of an end 39 or 41 captured by a camera 38 or 40 of the second imager 18, which will be used as the target image. The target image so captured will also have a top edge 52, a bottom edge 54, a right side edge 56, and a left side edge 58. However, edges 52, 54, 56 and 58 may not have the same relative positions as the edges 44, 46, 48 and 50 of the image of an end 32 or 37 taken by the first imager 12. Thus, when matching, if no match is made between the target image and a classified leading edge or a classified trailing edge, the target image is rotated 90 degrees (see FIG. 6B), clockwise or counter-clockwise, by the image matcher 22 and the rotated target image is compared to the classified leading end images (or the classified trailing end images) and then, if no match is obtained, the classified trailing end images (or the classified leading end images) stored in the classified image storage 16, until the target image is matched with a classified leading end image or a classified trailing end image. Once the image is matched with a leading end image or a trailing end image (reference image), the classified second end image becomes the target image and is matched to the other image that is paired/associated with the classified image that was matched with the first target image. Thus, for example, if the first target image (classified image of the first end 39) is matched with a classified leading end image, the target image (the classified end 41 image) is matched with the classified trailing end image that is associated with the first matched target image to verify the match. Once the image matcher 22 makes the match, the location of the billet in the stack 42 is stored for future retrieval, or the identified billet is marked automatically.

Figure 7:
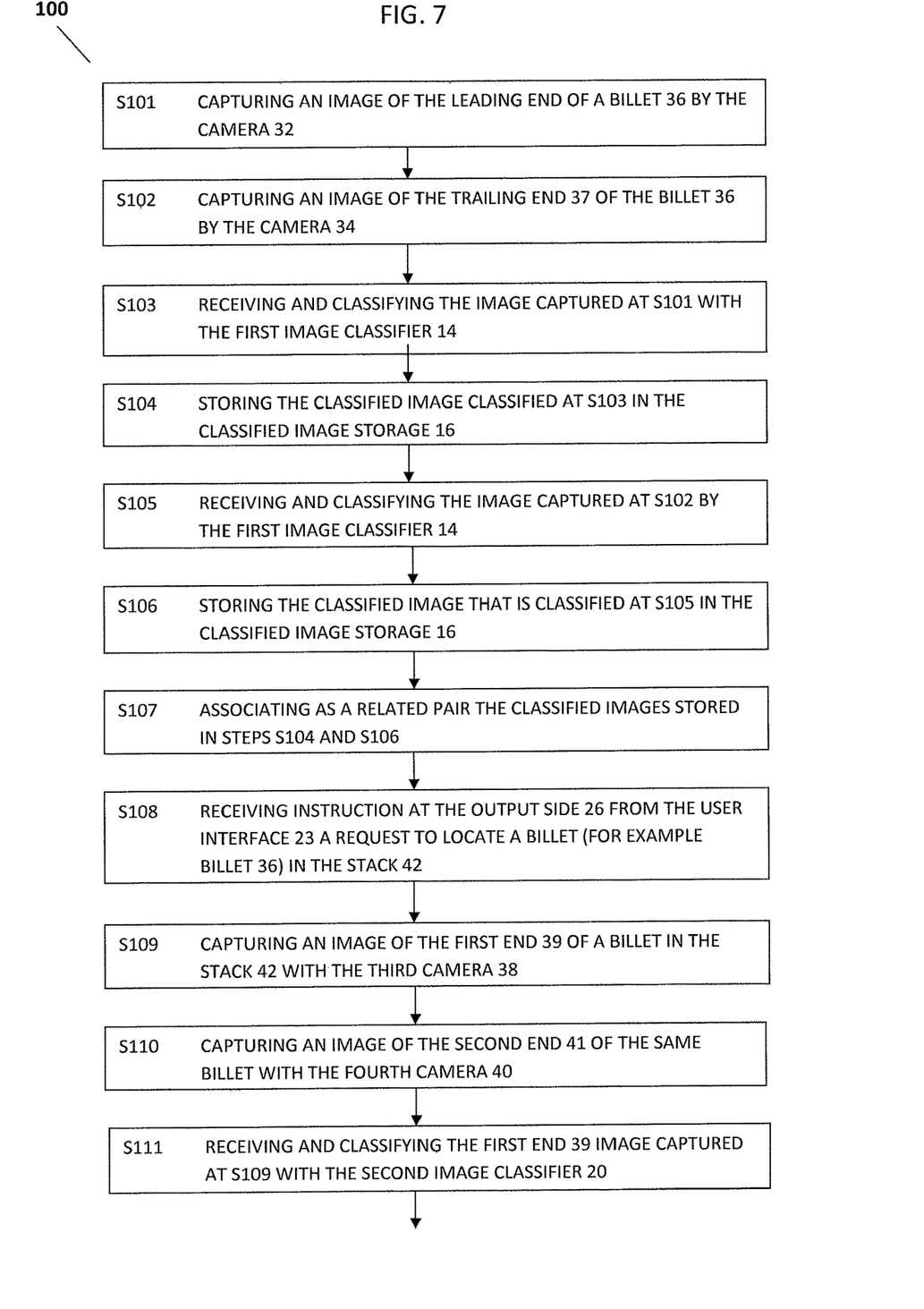
FIG. 7 is a flow diagram of the steps in a method carried out by a system according to the present invention.

Referring to FIG. 7, a method 100 according to the present invention includes capturing an image of the leading end of a billet 36 by the camera 32 (S101), capturing an image of the trailing end 37 of the billet 36 by the camera 34 (S102), receiving and classifying the image captured at S101 with the first image classifier 14 (S103), storing the classified image classified at S103 in the classified image storage 16 (S104), receiving and classifying the image captured at S102 by the first image classifier 14 (S105), storing the classified image that is classified at S105 in the classified image storage 16 (S106), associating as a related pair the classified images stored in steps S104 and S106 (S107), receiving instruction at the output side 26 from the user interface 23 a request to locate a billet (for example billet 36) in the stack 42 (S108), capturing an image of the first end 39 of a billet in the stack 42 with the third camera 38 (S109), capturing an image of the second end 41 of the same billet with the fourth camera 40 (S110), receiving and classifying the first end 39 image captured at S109 with the second image classifier 20 (S111), receiving and classifying the second end 41 image captured at S110 with the second image classifier 20 (S112), optionally, storing the classified images generated in steps S111 and S112 in a computer memory located at the facility 30 (S113), comparing the classified image classified at S111 (first target image) with all classified leading end images stored in the classified image storage 16 to find a match (S114), if no match is found in step S114, rotating by 90° (90 degrees) the first image that was compared in step S114 and repeating the comparing step S114 (S115), if no match is made in step S115, rotating by 180° (one hundred eighty degrees) the first image that was compared in step S114 and repeating the comparing step S114 (S116), if no match is made in step S116, rotating by 270° (two hundred seventy degrees) the first target image that was compared in step S114 and repeating the comparing step S114 (S117), if step S117 does not result in a match, repeating steps S114-S117 but, instead of comparing the first target image to the classified leading images, comparing the first target image with the trailing end images (S118), if no match is made in step S118, issuing an error generating and sending a message to the user interface 23 indicating that no match was made (S119), if a match is found in any one of the steps S114 to S118, comparing the classified image classified at S112 (the second target image) with the classified end image stored in the classified image storage 16 in association with the classified end image that was matched with the first target image to confirm a match (S120), if no match is found in step S120, rotating by 90° (90 degrees) the second target image that was compared in step S120 and repeating the comparing step S120 (S121), if no match is made in step S121, rotating by 180° (one hundred eighty degrees) the second target image that was compared in step S120 and repeating the comparing step S120 (S122), if no match is made in step S122, rotating by 270° (two hundred seventy degrees) the target image that was compared in step S120 and repeating the comparing step S120 (S123). If steps S120 to S123 do not result in a match, the method may include issuing an error message to the user interface device 23 indicating that no match was found (S124). If a match is found in any one of the steps S120, S121, S122, S123, the method may include identifying and recording in a computer memory located at the facility 30 the location of the matched billet as billet 36 in the stack 42 for future retrieval or marking of the billet 36 (S125).

In another embodiment, the matcher 122 would not rotate a classified image. The matcher 22 may send a request to the second image classifier 20 for a classified, rotated image. Upon receipt of the request, the second image classifier 20 will rotate the image (by first 90 degrees, and then 180 degrees, and then 270 degrees as deemed necessary), classify the rotated image, and send the classified rotated image to the matcher 22 to use as a target image for comparison with classified leading end images or the classified trailing end images as disclosed above.

Rotating an image or a classified image refers to virtually rotating the image, which may or may not be displayed by a computer monitor. To rotate an image or a classified image, the coordinates are angularly shifted around a central point axis, clockwise or counter-clockwise. The coordinates of the central axis would not be angularly shifted. Thus, the rotation would take place relative to a coordinate that remains invariable.

The method (system) disclosed herein should not be understood to be restricted to the identification of a billet in a stack, but can be applied to any group or collection of billets. Thus, the word "stack" as used herein is not limited to an arrangement in which one billet is placed on another billet, but to any grouping or collection of billets.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A locator system that is configured to locate a flame-cut billet in a stack of flame-cut billets and to send location information of a located billet to a billet marker, a billet transporter, a billet location storage system, or a billet location display system, the locator system comprising:
    an imager that includes at least one digital camera that can acquire a digital image of a first end or a second end of a billet in a stack of billets;
    an image classifier that includes at least one computer configured to classify a surface having surface characteristics resulting from flame cutting, and configured to classify a digital image of a first end or a second end of a billet that is received from the imager; and
    an image matcher that includes a computer configured to match a classified digital image of a first end or a second end of a billet that is received from the image classifier with a classified image from among a plurality of classified images stored in a classified image storage.

2. The locator system of claim 1, wherein the image classifier is configured to classify the digital image of the first end or the second end of the billet using pattern classification and recognition.

3. The locator system of claim 1, wherein the image matcher matches the classified digital image of the first end or the second end of the billet (target image) by comparing the target image to the plurality of classified images stored in the classified image storage, and, if the comparing does not result in a match, by further comparing an angularly rotated target image to the plurality of classified images stored in the classified image storage until a match is made, or no match is made.

4. The locator system of claim 3, wherein the image matcher rotates the target image to obtain the angularly rotated target image.

5. The locator system of claim 3, wherein the image matcher is configured to request the image classifier to angularly rotate the target image, and is configured to perform the matching based on an angularly rotated target image received from the image classifier.

6. The locator system of claim 1, wherein the classified image storage is connected to another image classifier that is configured to classify a digital image of a leading end or a trailing end of a billet captured by a digital camera of another imager after the billet is cast.

7. The locator system of claim 6, wherein the at least one digital camera of the another imager is capable of capturing images of the leading end or the trailing end of the billet at a temperature of up to 1200° C.

8. The locator system of claim 6, wherein the another image classifier is configured to classify a surface having surface characteristics resulting from flame cutting.

9. The locator system of claim 8, wherein the another image classifier classifies the digital image of the leading end or the trailing end of the billet using pattern classification and recognition.

10. The locator system of claim 6, wherein, for each billet, an image of a leading end of the billet and an image of a trailing end of the billet are classified by the another image classifier and stored in the classified image storage in association with one another, and wherein the associated images of the leading and trailing ends constitute the plurality of classified images.

11. The locator system of claim 10, wherein the image matcher is configured to first match the classified digital image of the first end or the classified digital image of the second end (target image) of the billet to either a classified leading end image or a classified trailing end image (reference image) stored in the classified image storage, and, after the target image is matched with a reference image, the image matcher is configured to match a classified image associated with the matched reference image with the classified digital image of the end of the billet that is opposite the target image.

12. The locator system of claim 11, wherein the image matcher is configured to match the classified digital image of the target image by comparing the target image to the plurality of classified images stored in the classified image storage, and, if the comparing does not result in a match, by further comparing an angularly rotated target image to the classified images stored in the classified image storage until a match is made, or no match is made.

13. The locator system of claim 12, wherein the image matcher is configured to rotate the classified digital image of the first end or the second end of the billet to obtain the angularly rotated target image.

14. The locator system of claim 12, wherein the image matcher is configured to request the image classifier to angularly rotate the image of the target image, and is configured to perform the matching based on an angularly rotated target image received from the image classifier.

15. A locating method for locating a flame-cut billet in a stack of flame-cut billets, the method comprising:
capturing an image of an end of a billet in a stack of billets with an imager that includes at least one digital camera that can acquire a digital image;
classifying the image of the end of the billet captured by the imager using an image classifier that includes at least one computer configured to classify a surface having surface characteristics resulting from flame cutting; and
matching the classified image of the end of the billet to a classified image from among a plurality of classified images in a classified image storage using an image matcher that includes a computer configured to match a classified digital image of an end of a billet with a classified image from among a plurality of classified images stored in the classified image storage.

16. The method of claim 15, wherein the classifying is performed using pattern classification and recognition.

17. The method of claim 15, wherein the matching is performed by first matching the classified image of the end of the billet (target image) to either a classified leading end image or a classified trailing end image (reference image) stored in the classified image storage, and, after the target image is matched with a reference image, matching a classified image associated with the matched reference image with the classified digital image of the end of the billet that is opposite the target image.

18. The method of claim 17, wherein the matching is performed by comparing the target image to the plurality of classified images stored in the classified image storage, and, if the comparing does not result in a match, by further comparing an angularly rotated target image to the plurality of classified images stored in the classified image storage until a match is made, or no match is made.

19. The method of claim 18, further comprising rotating the target image in the image matcher to obtain the angularly rotated target image.

20. The method of claim 18, further comprising rotating the target image with the image classifier to obtain the angularly rotated target image received from the image classifier.

* * * * *